Feb. 22, 1955 J. PROSKE Re. 23,954

TRACK LINK ASSEMBLY

Original Filed May 11, 1953 2 Sheets-Sheet 1

INVENTOR.
Joseph Proske
BY
Parker & Carter
ATTORNEY

TRACK LINK ASSEMBLY

Original Filed May 11, 1953 2 Sheets-Sheet 2

INVENTOR.
Joseph Proske
BY
Parker & Carter
ATTORNEYS

United States Patent Office

Re. 23,954
Reissued Feb. 22, 1955

23,954

TRACK LINK ASSEMBLY

Joseph Proske, Geneva, Ill., assignor to Burgess-Norton Mfg. Co., Geneva, Ill., a corporation of Illinois Original No. 2,687,923, dated August 31, 1954, Serial No. 353,945, May 11, 1953. Application for reissue November 3, 1954, Serial No. 466,707

6 Claims. (Cl. 305—10)

Matter enclosed in heavy brackets [ ] appears in the original patent but forms no part of this reissue specification; matter printed in italics indicates the additions made by reissue.

This invention relates to improvements in tread units for endless tracks of a military vehicle or similar vehicles, and more particularly to tread units having [all-rubber] detachable bottom faces for engagement with the ground, *such as those made of rubber.*

Under many operating conditions, it has been found advantageous to use [molded rubber] *such detachable* bottom tread surfaces, including integral grousers or cleats, as well as flat rubber upper surfaces for engagement with the bogie wheels. Heretofore, it has been common practice to mold [the] rubber tread surfaces directly to the under sides of the metal pivot sleeves and the end frame members of the tread unit. In such cases, the bottom tread surfaces with their grousers wear away from engagement with the ground and are worn away long before the upper surfaces. The bottom tread surfaces frequently wear so rapidly that the under surfaces of the metal pivot tubes and end frames become exposed to damage. In any event, the greater wear on the bottom tread surface makes frequent replacement of an entire tread unit necessary long before the remainder of such unit has lost its usefulness, and also requires disconnection of the track for replacement of individual tread units.

It has previously been proposed, as for instance in prior Patents No. 2,350,445 and No. 2,353,124 issued to F. E. Burgess, to provide detachable ground engaging shoes for endless tread track units, but such constructions have utilized all-metal shoes clamped to the lower faces of the pivot sleeves and riveted at a plurality of points to an upper plate connecting the two pivot sleeves together. Such structures have certain disadvantages when the ground surface is made entirely of rubber for reasons that will presently appear.

Among the objects of the present invention is to provide a simple and sturdy tread unit structure including a detachable [rubber-bottomed] shoe, having improved means for rigidly connecting the shoe directly to the end frame members of the tread unit, rather than clamping the shoe to the pivot sleeves.

*A further object of the invention is to provide a tread unit structure, including a detachable rubber bottomed shoe, having means for rigidly connecting the shoe directly to the end frame members of the tread unit.*

A further object of the invention is to provide a removable shoe having a metal plate or base to which the rubber-bottomed tread is molded, so as to afford protection to the pivot sleeves of the tread unit in case of excessive wear of the rubber tread, or in case the rubber-bottomed tread is accidentally torn away from the unit.

Other objects of the invention will appear from time to time as the following description proceeds.

The invention may best be understood by reference to the accompanying drawings, in which.

Figure 1:
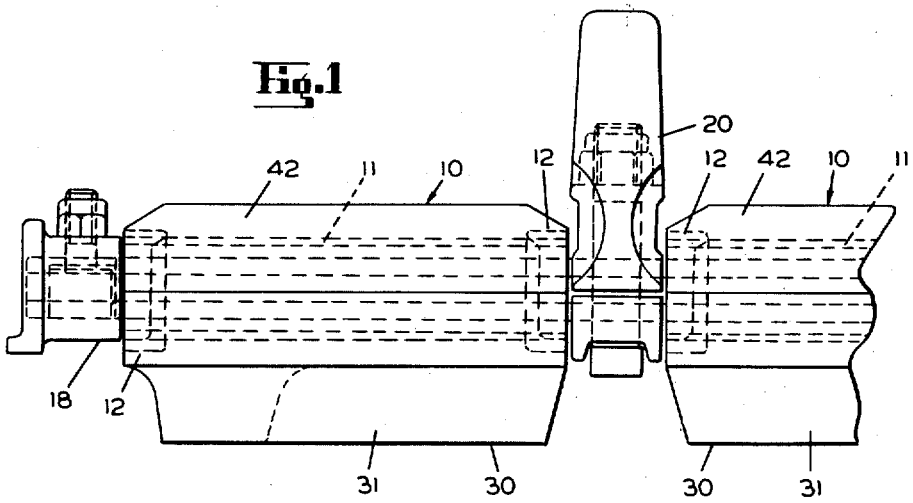
Figure 1 is a fragmentary side view of an endless tread member of the double-strand, center-guide type, wherein two similar tread units are employed in side-by-side relation, constructed in accordance with my invention.

Referring now to details of the embodiment of my invention shown in the drawings, a pair of similar tread units, indicated generally at 10, 10, each consists of a pair of parallel spaced, tubular metal pivot bearing sleeves 11, 11 extending transversely of the track proper, and rigidly connected at opposite ends by end bars 12, 12. Each of said bars has eyes 13, 13 within which the ends of the pivot sleeves 11 are secured as by brazing or welding. The pivot sleeves 11, 11 and end bars 12, 12 of each tread unit thus form a rigid open rectangular frame which is pivotally mounted, as usual, on pivot pins 16, 16 extending through rubber bushings 17, 17 in the pivot sleeves 11, 11 (see Figure 5). Relatively short C-shaped connectors 18, 18 are suitably secured at opposite ends thereof, so that said connectors join similar pairs of pivot pins of adjacent tread units in short-coupled relationship.

In the illustrative form shown herein, the two tread units 10, 10 are mounted in side-by-side relation on elongated pairs of pivot pins 16, and said pivot pins are also adapted to be joined to adjacent similar tread units at a point between the adjacent ends of the tread units 10, 10 by a center guide link 20. The pivot pins 16, resilient rubber bushings 17, C-shaped end connectors 18 and center guide link 20 are all of well-known construction and form no part of the present invention so need not be described in further detail.

Figure 3:
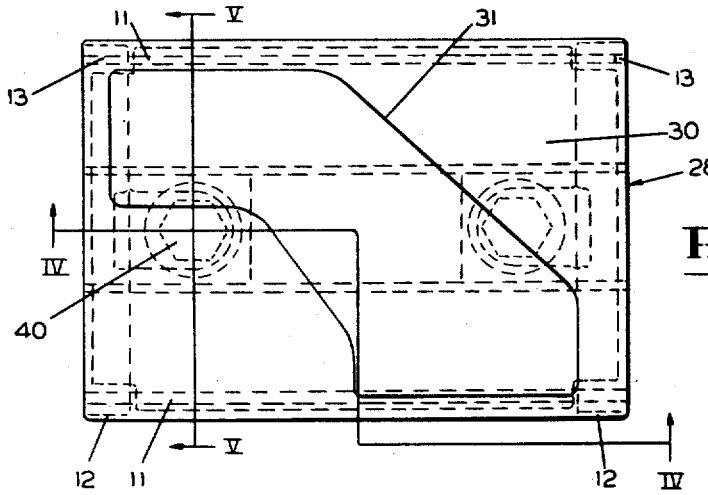
Figure 3 is a bottom view of a single tread unit of the kind shown in Figures 1 and 2.
Figure 4:
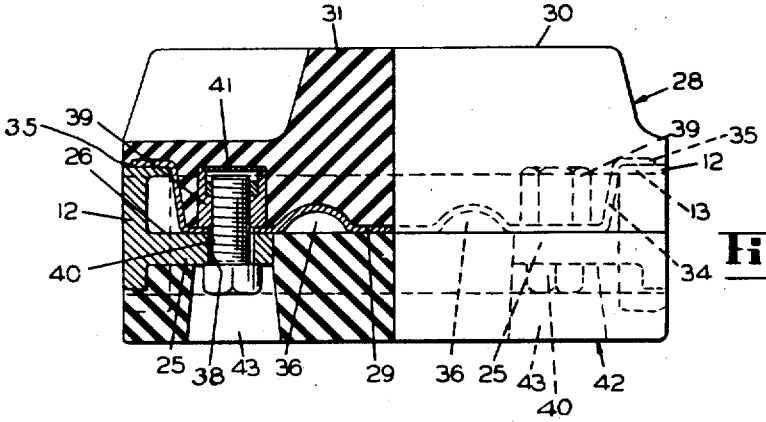
Figure 4 is a detail section taken on line IV—IV of Figure 3.
Figure 5:
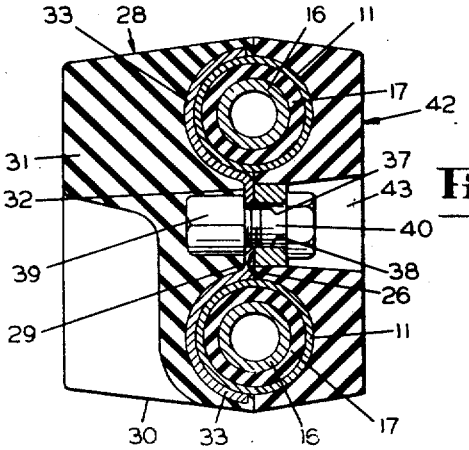
Figure 5 is a detail section taken on line V—V of Figure 3, and also showing the pivot pins and rubber bushings for the tread unit in section.

Referring now to the individual tread units 10 which embody the subject matter of the present invention, Figures 3, 4 and 5 show that each of the end bars 12, 12, which connect the ends of the pivot sleeves 11, 11 together, have integral, inwardly projecting wings or lugs 25, 25. These lugs extend inwardly between the adjacent sides of the pivot sleeves and are each preferably disposed with its upper face 26 substantially in a plane including the axes of said pivot sleeves. The wings 25 are relatively short, herein each extending approximately one-quarter of the distance between the two end plates 12, 12.

The bottom tread shoe, indicated generally at 28 (shown inverted in Figure 4), consists of a metal plate 29 having a rubber tread block 30 molded thereon. Said plate is pressed or otherwise formed with a central trough 32, and parallel channels 33, 33 are substantially semi-circular in transverse section to conform in shape with and fit along the lower halves of the pivot sleeves 11, 11, as shown in Figure 5. The opposite ends of the trough 32 are closed by downwardly and outwardly inclined end walls 34 which terminate in flanges 35, 35 adapted to fit along the adjacent lower faces of the end plates 12, 12 in underlapping engagement. The plate 29 also has shallower transverse troughs 36, 36, herein two in number, near the center of the plate, to provide a stiffener for the latter and resulting in a reduction in the amount of rubber necessary for the rubber tread block 30.

The plate 29 has a pair of centrally disposed apertures 37, 37 in spaced relation near opposite ends of the trough 32 in position to register with fastening holes 38, 38 extending through the wings 25, 25 or the end bars 12, 12 of the tread unit frame.

A pair of nuts 39, 39, for reception of fastening bolts 40, 40, are preferably fixed on the upper face of the plate 29 in registering relation to the apertures 37, 37 in the latter. In the form shown, said nuts have their outer ends closed by end plates 41, 41 (see Figure 4) so as to prevent rubber flowing into the screw threads, thus permitting the rubber tread block to be molded on the plate 29 with said nuts secured thereon. Said nuts may be of any suitable safety or lock nut type, details of which need not be further described.

The rubber tread block 30 is formed by molding and vulcanizing the rubber to the under face of plate 29, with a grouser or cleat 31 molded integral therewith.

Figure 2:
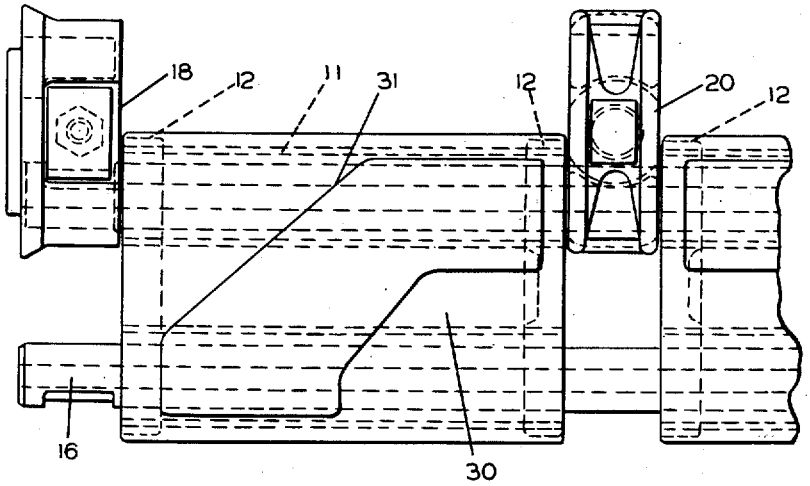
Figure 2 is a bottom view of the tread member shown in Figure 1.

In the form in Figure 2, the grousers on the two tread units are formed as "rights" and "lefts" in the familiar chevron pattern, but it will be understood that they can be of any other suitable pattern or arrangement desired.

Referring now to the upper face of the tread unit, which normally engages the bogie wheels of the vehicle, said upper face is formed of a rubber block 42 which is molded on and vulcanized directly to the upper surface of the pivot sleeves 11, 11 and also to the lower portions of the end bars 12 and the fastening wings 25.

The upper block 42 has a pair of flared apertures 43, 43 in registering relation with the apertures 38, 38 in the wings 25, so as to permit the insertion of the fastening bolts 40, 40 through said wings and into threaded engagement with the nuts 39, 39, as shown in Figures 4 and 5.

The upper rubber block 42 is formed in a suitable mold to a parting plane including substantially one-half the pivot sleeves, and flush with the inner faces of the fastening wings 25, in such a manner that said upper block is complementary to the lower tread block 30 when the latter is in assembled relation on the unit, as shown in Figures 4 and 5. In particular, it will be observed that the exposed lower face of the upper rubber block 42 is normally flush with the upper face of plate 29 in the space between the wings 25, so that said plate provides a support for the rubber in both upper and lower blocks 42 and 30, and prevents excessive up-and-down movement of the rubber between the two pivot sleeves (commonly termed "kneading"), which otherwise tends to cause generation of heat, sometimes sufficient to destroy the bond between the rubber and metal surfaces, and even to produce blowouts of the rubber. The plate 29 also serves as a metal conductor for any heat generated in the rubber blocks to the exterior of the tread unit.

The use and operation of the tread structure is as follows:

The rubber tread block 42 is permanently fixed to the pivot sleeves 11 and bars 12 so as to form the base portion to which the shoe 28, comprising plate 29 and rubber block 30, is detachably fastened, as previously described. As a result, the detachable shoe 28 can be removed when worn and replaced by a new shoe, without disconnecting the tread unit as a whole from the endless track.

It will be observed that the detachable shoe 28 is connected directly to the wings 25, 25 of the end bars 12, 12 rather than to the pivot sleeves 11, 11 as in previous tread structures, thus effecting a better distribution of the driving stresses by relieving the sleeves from excessive strain and distortion.

In the event that the rubber block 30 becomes worn or torn away to a level with the pivot sleeves, the latter will be protected by the arched portions of the plate 29 until such time as the shoe is removed and replaced.

Although I have shown and described certain embodiments of my invention, it will be understood that I do not wish to be limited to the exact construction or operation shown and described, but that various changes and modifications may be made without departing from the spirit and scope of the invention as defined in the appended claims.

I claim:

1. In an endless track construction, a tread unit consisting of a pair of tubular metal pivot sleeves spaced in parallel relation to each other, end plates connecting said pivot sleeves together at opposite ends to form a rigid frame, said end plates having integral wings extending inwardly between said sleeves at opposite ends of said frame, an upper rubber block permanently molded to one face of said frame to a parting plane including substantially one-half of said sleeves, and a detachable tread shoe including a metal plate formed to fit over the opposite face of said frame and upper rubber block, and a lower rubber block permanently molded on said plate, to form a ground-engaging surface, and means for detachably fastening said plate to the wings on said end plates, accessible through one of said rubber blocks.

2. A structure in accordance with claim 1, wherein the metal plate includes a pair of parallel spaced channels substantially semi-circular in cross-section to conform to the shape of the under faces of the sleeves for substantially the full length thereof, and joined by a centrally disposed trough terminating in upwardly and outwardly flanged ends, to fit over the adjacent side frame members.

3. A structure in accordance with claim 2, wherein nuts on the lower face of the channel are molded in the lower rubber block in registering relation with apertures in the plate and wings, for securing by bolts passing through said apertures and accessible from the upper face of the upper rubber block.

4. A structure in accordance with claim 3, wherein the upper rubber block has a substantially flat upper face recessed for access to the bolts.

*5. In an endless track construction, a tread unit consisting of a pair of tubular metal pivot sleeves spaced in parallel relation to each other, end plates connecting said pivot sleeves together at opposite ends to form a rigid upper frame, said end plates having integral wings extending inwardly between said sleeves at opposite ends of said frame, an upper rubber block permanently molded to the upper face of said frame to a parting plane including substantially one-half of said sleeves, and a detachable tread shoe having its upper face formed to fit over the lower face of said frame and upper rubber block, the lower face of said tread shoe forming a ground-engaging surface, and means for detachably fastening said tread shoe to the wings on said end plates.*

*6. In an endless track construction, a tread unit consisting of a pair of tubular metal pivot sleeves spaced in parallel relation to each other, end plates connecting said pivot sleeves together at opposite ends to form a rigid upper frame, said end plates having integral wings extending inwardly between said sleeves at opposite ends of said frame, an upper rubber block permanently molded to one face of said frame substantially flush with the lower faces of said wings and including substantially one-half of said sleeves, and a detachable tread shoe having its upper face formed to fit over the lower face of said frame, wings and upper rubber block, the lower face of said tread shoe forming a ground-engaging surface, and means for detachably fastening said tread shoe to the wings on said end plates.*

No references cited.